(12) United States Patent
Jamdade et al.

(10) Patent No.: US 12,135,846 B2
(45) Date of Patent: Nov. 5, 2024

(54) INTELLIGENT HUMAN/MACHINE INTERFACE (HMI) FOR POWER CONTROLLER DEVICE

(71) Applicant: Vertiv Corporation, Westerville, OH (US)

(72) Inventors: Amruta B. Jamdade, Chandannagar (IN); Niketan Patil, Wardha (IN); Rahul A. Gosavi, Pune (IN)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 18/225,986

(22) Filed: Jul. 25, 2023

(65) Prior Publication Data

US 2024/0028150 A1    Jan. 25, 2024

(30) Foreign Application Priority Data

Jul. 25, 2022    (IN) .............................. 202211042490

(51) Int. Cl.
| | |
|---|---|
| *G06F 3/041* | (2006.01) |
| *G06F 3/01* | (2006.01) |
| *G06F 3/042* | (2006.01) |
| *G06F 3/0482* | (2013.01) |
| *G06F 3/0488* | (2022.01) |

(52) U.S. Cl.
CPC ............ *G06F 3/0416* (2013.01); *G06F 3/017* (2013.01); *G06F 3/0425* (2013.01); *G06F 3/0482* (2013.01); *G06F 3/0488* (2013.01); *G06F 2203/04108* (2013.01)

(58) Field of Classification Search
None
See application file for complete search history.

(56) References Cited

U.S. PATENT DOCUMENTS

| | | |
|---|---|---|
| 6,384,735 B1 | 5/2002 | Rabou et al. |
| 6,785,992 B2 | 9/2004 | Chiarucci |
| (Continued) | | |

FOREIGN PATENT DOCUMENTS

| | | |
|---|---|---|
| CN | 201051648 Y1 | 4/2008 |
| CN | 214376803 U | 10/2021 |
| (Continued) | | |

*Primary Examiner* — Stephen T. Reed
(74) *Attorney, Agent, or Firm* — Suiter Swantz IP

(57) ABSTRACT

An intelligent graphic human/machine interface unit (GHMI) for a power controller device detects, via visual sensors, a user proximate to the device and transitions from "sleep" to "command" mode. When in "command" mode, a user may authenticate themselves to the device, and provide (e.g., in "active" mode) control input for executing device functions, either via a touchscreen display of the GHMI unit or via unlock and command gestures manually performed by the user, detected by the visual sensors, and decoded by the GHMI controller. Command gestures may be mapped to specific control functions and/or command sequences commonly executed by the power controller device. By allowing a user to provide authentication and control input via signed gestures, a user wearing protective gloves or other protective gear precluding use of a capacitive touchscreen may interact with, monitor, or manage the power controller device normally.

20 Claims, 7 Drawing Sheets

(56) References Cited

U.S. PATENT DOCUMENTS

| | | |
|---|---|---|
| 9,434,307 B2 | 9/2016 | Alexander |
| 9,677,756 B1 | 6/2017 | Johnson |
| 10,663,832 B1 | 5/2020 | Nagel et al. |
| 10,896,573 B2 | 1/2021 | Nelson |
| 2002/0109605 A1 | 8/2002 | Liu |
| 2007/0171053 A1 | 7/2007 | Heppeler |
| 2017/0046991 A1* | 2/2017 | Riegel .................. G02B 6/0093 |
| 2018/0127134 A1 | 5/2018 | Squires |
| 2020/0348516 A1 | 11/2020 | Sakata et al. |
| 2021/0088999 A1 | 3/2021 | Main-Reade et al. |
| 2021/0239831 A1* | 8/2021 | Shin ..................... G01S 13/886 |
| 2022/0382383 A1* | 12/2022 | McRae ................. G06V 40/28 |

FOREIGN PATENT DOCUMENTS

| | | |
|---|---|---|
| EP | 2958088 A1 | 12/2015 |
| JP | H08373 U | 2/1996 |
| KR | 101143605 B1 | 5/2012 |

* cited by examiner

+  ------

INTELLIGENT HUMAN/MACHINE INTERFACE (HMI) FOR POWER CONTROLLER DEVICE

CROSS-REFERENCE TO RELATED APPLICATIONS

This application claims priority under 35 USC § 365 to prior filed Indian provisional patent application 202211042490 filed Jul. 25, 2022. Said Indian provisional patent application 202211042490 is hereby incorporated by reference in its entirety.

TECHNICAL FIELD

The present disclosure is directed to systems and methods for power control and, more particularly, to user interfaces (UI) for power control devices.

BACKGROUND

Many uninterruptible power systems (UPS) and other power controller devices incorporate a graphical human/machine interface (GHMI) to provide quick device status displays to end users. Further, GHMI units are often equipped with touch-sensitive display surfaces allowing end users to provide control input. However, conventional touchscreen surfaces are capacitive touchscreen bases incorporating an outer surface insulator and a transparent conductive layer beneath the insulator. It is this conductive layer that sends command signals (e.g., to a controller unit of the device) based on a conductive connection between the conductive layer and the user's fingertips. When end users wear protective (e.g., insulating) gloves, however, these gloves restrict the flow of electricity between the fingertips and the touchscreen, making touchscreen-based control impossible unless the end user removes their gloves.

Further, while GHMI units may display quick-reference device information to end users, in configurations incorporating multiple UPS units it may be difficult to determine at a glance which individual device or devices may be in a warning or alert state requiring further attention. Closer inspection of multiple devices may be necessary to determine which device is in a critical state, taking away response time as the end user identifies the device needing attention.

SUMMARY

In a first aspect, a power controller device is disclosed. In embodiments, the power controller device includes an exterior housing, a main controller for managing device operations and monitoring the operating status of the device. Lighting elements in the exterior housing may illuminate based on the operating status (e.g., color-coded) and may blink while in sleep mode, e.g., until a user is detected. The device includes a graphical human-machine interface (GHMI, HMI) incorporating a touch-sensitive display surface for displaying indicators of the operating status while in sleep mode. The device includes cameras and/or visual sensors for detecting when a user enters a proximity zone adjacent to or near the HMI (e.g., with the intention of interacting with the device). When a user is detected, the lighting elements transition to indicate the detection, e.g., brighter illumination, solid vs. blinking illumination.

In some embodiments, the visual sensor includes visible light cameras and/or infrared (IR) sensors.

In some embodiments, when a user is detected within a proximity zone of the power controller device, the visual sensors and HMI authenticate the user as an authorized user of the device by detecting and deciphering unlock gestures manually performed by the user.

In some embodiments, when a user is authenticated, the device transitions from wakeup mode to command mode, whereby the GHMI display provides more detailed operating information to the user and accepts control input. For example, control input may be provided via the touchscreen or via command gestures performed by the user, detected by the visual sensors, and deciphered by the GHMI as mapped to specific command functions.

In some embodiments, when a command gesture is identified by the GHMI, the device executes any associated command functions to which the identified gesture or gestures are mapped.

In some embodiments, unlock gestures and command gestures are based on linguistic elements or features, e.g., letters, words, expressions, or combinations thereof, associated with one or more sign languages.

In some embodiments, exterior lighting of the device is configured according to blinking or solid lighting schemes.

In some embodiments, the operating status of the power controller device includes a nominal status, a warning status, or an alert status. For example, the exterior lighting may be color-coded based on the current operating status, e.g., green/nominal, yellow/warning, red/alert.

In some embodiments, the GHMI display may partially illuminate (e.g., color-coding) based on, or including an indicator of, the operating status.

In some embodiments, exterior lighting of the power controller device includes perimeter lights enclosing, or adjacent to, the GHMI display.

In some embodiments, the exterior lighting includes floor lights, back lights, or other exterior lighting of the power controller device that may be color-coded to the current operational status or may illuminate in a neutral color.

In some embodiments, the floor lights or back lights, or other exterior lighting may activate when the user is detected within the proximity zone.

In some embodiments, the power controller device may be a power supply controller, a power converter controller, a rectifier controller, or a thermal monitoring controller.

In a further aspect, a method for intelligent human/machine interfacing with a power controller device is disclosed. In embodiments, the method includes determining an operating status of the power controller device. The method includes illuminating exterior lighting of the power controller device to indicate the operating status, according to a lighting scheme consistent with a sleep or inactive mode of the device. The method includes detecting, via an exterior camera or visual sensor of the device, a user proximate to the device. The method includes adjusting the exterior lighting of the device in response to the detection of the user. The method includes authenticating the user as an authorized user of the device by detecting, via the camera, an unlock gesture signed or otherwise performed by the user. The method includes detecting command gestures signed or performed by an authenticated user via the camera. The method includes executing any command functions of the power controller device corresponding to the detected command gestures.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
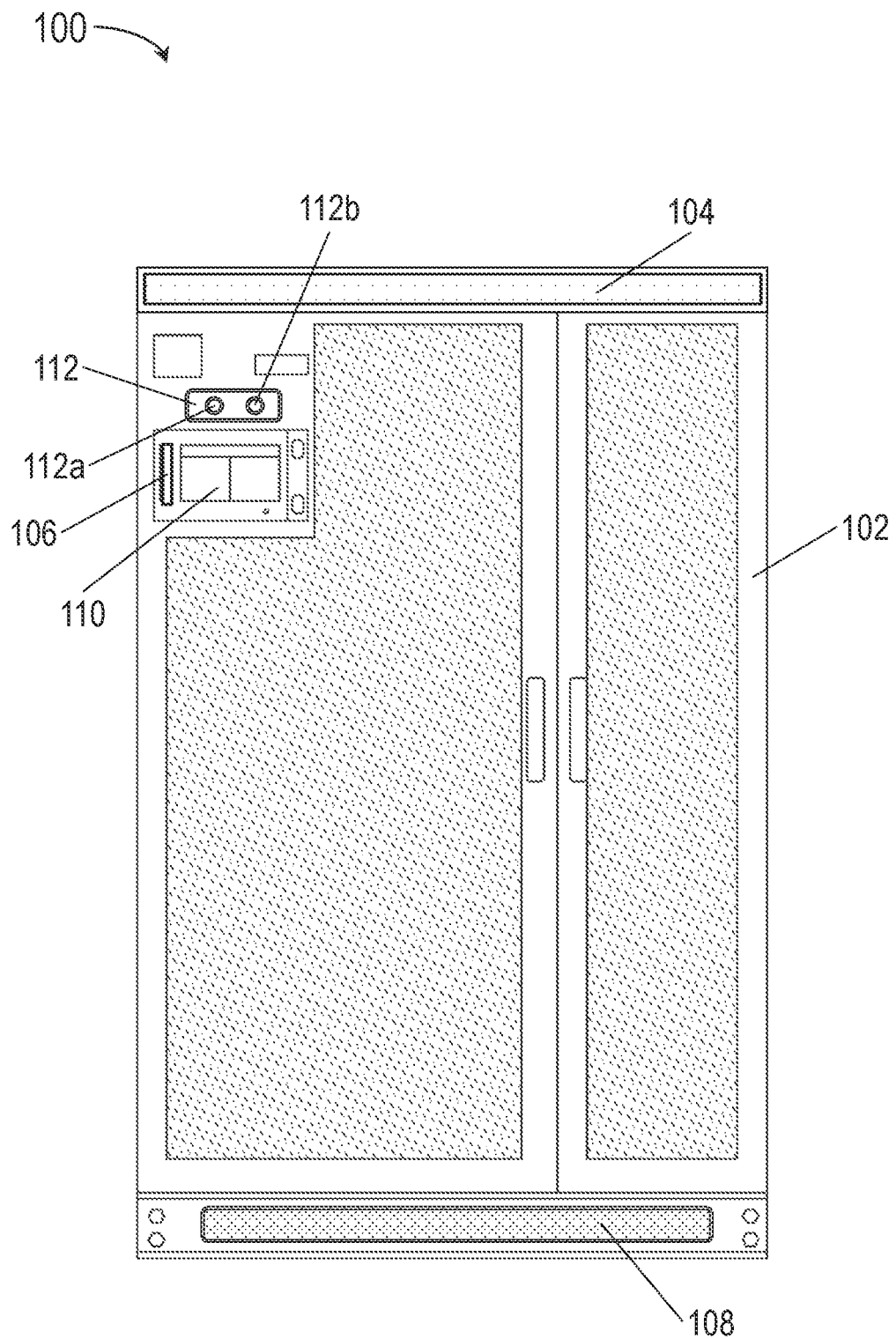
FIG. 1 is a forward view of a power controller device incorporating an intelligent graphical human/machine interface (GHMI) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for intelligent graphical human/machine interfacing (GHMI) for uninterruptible power supplies and other like power controller devices. For example, the smart GHMI provides for clear, visible, at-a-glance displays of device operational status, allowing an end user to quickly determine which, if any, devices in a multi-device configuration require further attention. Further, the intelligent GHMI can visually detect an end user at the device, authenticate the end user as authorized to perform command functions on the device, and execute a desired sequence of command functions without requiring the user to remove their protective gloves or physically interact with the device.

Referring to FIG. 1, a power controller device 100 is shown. The power controller device 100 may be an uninterruptible power supply (UPS), thermal management unit, power distribution device, static transfer switch (STS) or any other appropriate type of power controller device known in the art. The power controller device 100 may include an exterior housing 102, exterior lighting elements 104, perimeter lights 106, auxiliary lighting elements 108 (e.g., auxiliary lights), a graphical human/machine interface (GHMI, HMI) unit 110, and visual sensors 112.

In embodiments, the power controller device 100 may incorporate a main controller unit (not shown) for monitoring the operating status of the power controller device 100. For example, the power controller device 100 may maintain a nominal operating status (e.g., no system faults or potential faults indicated); a warning status (potential for imminent system fault, but no specific fault yet detected); or an alert status (e.g., system faults detected that may require intervention by an end user). The main controller, and other internal components of the power controller device 100, may be disposed within the exterior housing 102, which may be perforated or ventilated to allow airflow through the exterior housing (e.g., for cooling of interior components). In some embodiments, the main controller unit may periodically or continually assess the current operating state of the power controller device.

In embodiments, the exterior lighting elements 104 may be attached to, or set into, the exterior housing 102 and directed by the main controller to illuminate according to the current operating state. For example, the exterior lighting elements 104 may incorporate multiple light emitting diode (LED) units configured for luminous emissions in a variety of colors, such that the specific output of the exterior lighting elements corresponds to the current operating state, providing at-a-glance indication of the current operating state to an end user (who may, for example, be monitoring a configuration of multiple such power controller devices simultaneously). In embodiments, the exterior lighting elements 104 may illuminate in a green color to indicate a nominal state, a yellow color to indicate a warning state, or a red color to indicate an alert state.

In embodiments, the exterior lighting elements 104 may illuminate according to a lighting scheme indicative of a lack or absence of interaction with the power controller device 100 by the end user. For example, the exterior lighting elements 104 may blink at a predetermined rate and according to the color corresponding to the current operating state. In some embodiments, the exterior lighting elements 104 may convey additional operating status information by blinking at a faster, slower, staggered, or irregular rate. For example, the exterior lighting elements 104 may blink faster if the power controller device 100 is in an alert (e.g., red) state for an extended duration. In embodiments, the exterior lighting elements 104 may continue to blink in the appropriate color unless or until an end user interacts with the power controller device 100 as described below.

In some embodiments, exterior lighting elements of the power controller device may include perimeter lights 106. For example, perimeter lights 106 may illuminate similarly to the exterior lighting elements 104, except that the perimeter lights 106 may be disposed adjacent or proximate to the GHMI unit 110.

In some embodiments exterior lighting of the power controller device 100 may include auxiliary lights 108 set into the exterior housing 102. For example, auxiliary lights 108 may illuminate similarly to the exterior lighting elements 104 and perimeter lights 106. In some embodiments, auxiliary lights 108 may illuminate according to a neutral lighting scheme not indicative of an operating status of the power controller device 100 (e.g., white light). Auxiliary lights 108 may include floor lights (e.g., adjacent or proximate to the bottom of the power controller device 100) or back lights (not shown, e.g., configured for illumination of a space or wall directly behind the power controller device as shown by FIG. 1). In some embodiments, some or all auxiliary lights 108 may remain deactivated unless or until an end user is detected by the power controller device 100, at which time the auxiliary lights may activate.

In embodiments, the visual sensors 112 may include infrared (IR) sensors 112*a* and/or visible-light cameras 112*b*. For example, the IR sensors 112*a* may detect an end user proximate to the power controller device 100 as described below, e.g., via motion detection and/or thermal imaging detected by image analysis via processors in the main controller unit. In some embodiments, the visible-light cameras 112*b* may detect unlock or command gestures manually performed by a detected end user. For example, when an end user is detected as described below, processors in the main controller unit may activate the visible-light cameras 112*b* and perform image analysis to detect an unlock gesture or a command gesture. When the unlock or command gesture is detected with sufficient confidence, the main controller unit may carry out any command functions or command sequences associated with the detected gesture.

Figure 2:
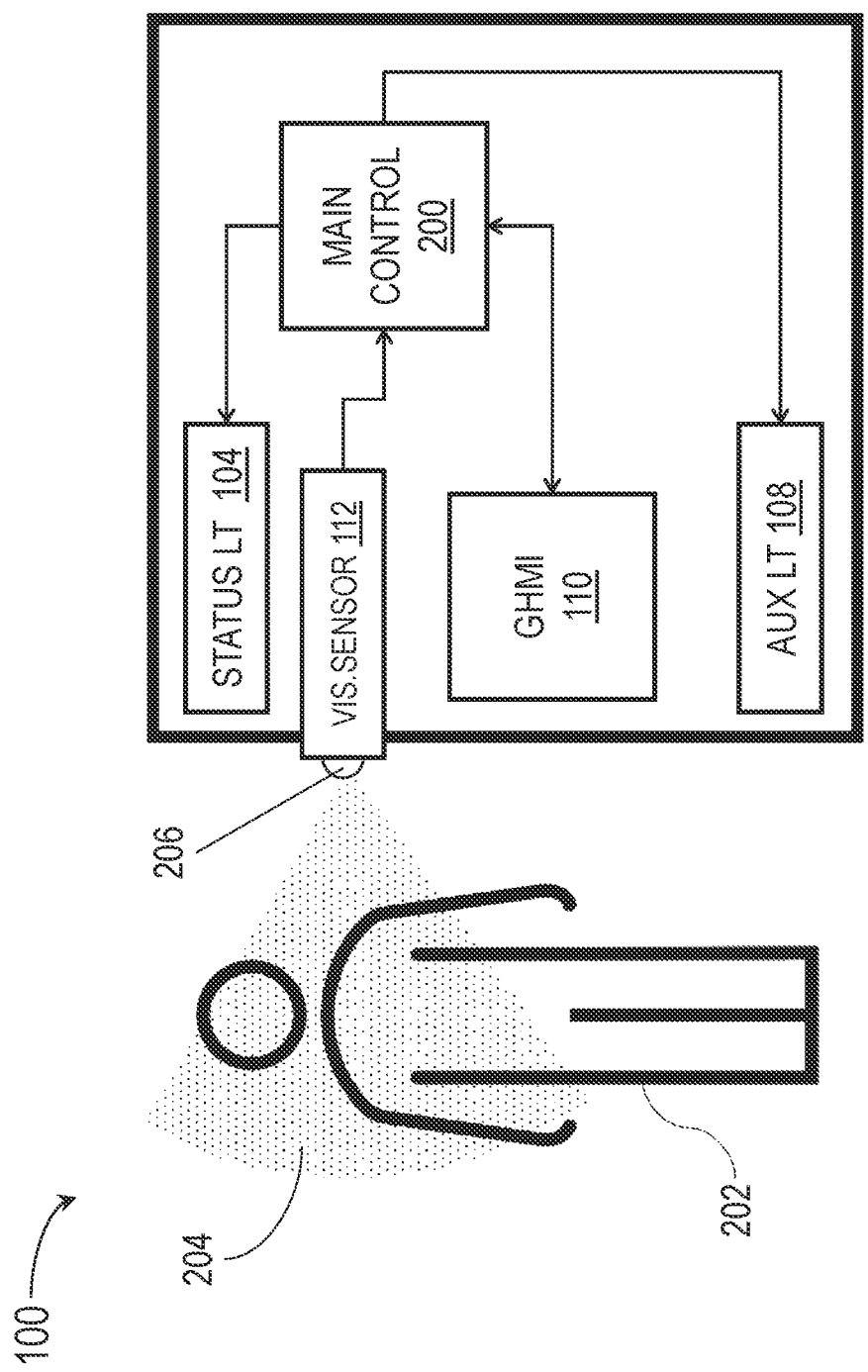
FIG. 2 is a block diagram illustrating components of the power controller device of FIG. 1

Referring to FIG. 2, the power controller device 100 is shown. The power controller device may include a main controller 200 as described above.

In embodiments, the power controller device 100 may operate in one of several modes (e.g., not to be confused with the operating status described above). For example, the power controller device 100 may operate in a dormant or "sleep" mode when an end user 202 is not interacting with the power controller device 100 via the GHMI unit 110, or has not interacted with the power controller device for a predetermined duration, e.g., at which time the power controller device may enter "sleep" mode and the illumination of the exterior lighting elements 104 and/or auxiliary lights 108 (as well as the information displayed by the GHMI unit 110) may reflect the change in mode. For example, any illuminated lighting elements may be reduced in intensity. Similarly, the GHMI unit may revert to a "sleep" mode display (see FIG. 3A below) indicative of reduced content.

In embodiments, the visual sensors 112 may monitor a zone 204 directly adjacent or proximate to the power controller device 100 (e.g., even when the power controller device is otherwise in "sleep" mode) to determine if an end user 202 is present within the zone and, accordingly, may intend to interact with the power controller device. For example, the main controller 200 may continually analyze imagery captured by the visual sensors 112 (e.g., wide-angle IR sensors 112*a*, FIG. 1) to determine if the captured imagery is indicative of the presence of an end user 202 within the zone 204. In some embodiments, the size of the zone 204 may be predetermined, e.g., a particular radius in front of the visual sensors 112. Accordingly, the visual sensors 112 may include, e.g., pyroelectric infrared (PIR) sensors and/or a Fresnel lens 206 or like optical device for focusing IR emissions of the IR sensors 112*a* to concentrate the ability of the IR sensors to detect human presence within the zone 204 (e.g., via detected figure and/or movement thereof).

In embodiments, when the main controller 200 determines that the end user 202 has been detected to a sufficient confidence level, the power controller device 100 may be transitioned into wakeup or "command" mode (see, e.g., FIG. 3B below). For example, auxiliary lights 108 may activate, and/or the illumination of the exterior lighting elements 104 may change to reflect the transition in mode (e.g., from blinking output to solid output in the appropriate color). Further, the display surface of the GHMI unit 110 may change to reflect the transition in mode (e.g., as noted above and as disclosed in detail below with respect to "sleep", "command", and "active" display modes). Additionally, once the end user 202 has been detected and the power controller device 100 has transitioned from "sleep" mode to "command" mode, the wide-angle IR sensors 112*a* may be deactivated in favor of a visible-light camera 112*b* capable of more detailed image capture, e.g., to facilitate the more precise detection of unlock and command gestures manually performed by the end user.

In embodiments, when the end user 202 has been detected by the power controller device 100 as present within the zone 204, the power controller device may further determine (e.g., via the visual sensors 112 and main controller 200 or GHMI unit 110) whether or not the end user is an authenticated end user, e.g., authorized to initiate command functions or command sequences executable by the main controller 200. For example, an end user 202 may otherwise execute command functions via the touchscreen surface of the GHMI unit 110, which may display additional status indicators and/or command menus accessible to an authenticated end user. However, as noted above the end user 202 may wear protective gloves or other hand protection precluding manual use of the display surface of the GHMI unit 110. Accordingly, in embodiments the end user 202 may unlock the GHMI unit 110 and/or main controller 200 (e.g., transition the GHMI and/or main controller from "command" mode to "active" mode) by performing an unlock gesture (or sequence thereof) detectable by the visual sensors 112 (e.g., via the visible-light camera 112b, FIG. 1). For example, the end user 202 may execute a simple gesture with his/her/their hand, e.g., forming or tracing a shape or signing a letter, word, or other linguistic element (e.g., according to any appropriate regional sign language variant) decipherable by the main controller 200 as a preselected unlock gesture. Similarly, if the end user 202 would ordinarily unlock the GHMI unit 110 and main controller 200 into "active" mode by entering a password, passphrase, or like encoded character sequence via the GHMI unit touchscreen, the end user 202 may alternatively sign the character sequence, e.g., according to American Sign Language (ASL) or national/regional equivalents, before the visual sensors 112 as described in greater detail below.

In embodiments, the power controller device 100 and/or GHMI unit 110 may remain in a locked configuration (e.g., "sleep" mode or "command" mode) until unlocked by the end user 202 into "active" mode. For example, when in the locked configuration, the power controller device 100 may not accept control input either via the GHMI touchscreen or as gestures detectable by the visual sensors. The power controller device 100 may remain in locked configuration even when the end user 202 is detected as present within the zone 204 (although, for example, the display of the GHMI unit 110 may brighten and display additional content to indicate the transition from "sleep" mode to "command" mode; see, e.g., FIG. 3B below), until the end user performs the appropriate unlock gesture/s and the unlock gesture/s is are detected and deciphered by the main controller 200 to a sufficient confidence level.

In embodiments, when the end user 202 is authenticated, the power controller device 100 may transition into an unlocked configuration (e.g., "active" mode) wherein the end user may continue to interact with the main controller 200 via command gestures detectable by the visual sensors 112. For example, the authenticated end user 202 may perform one of a set of preselected command gestures, each command gesture associated with a specific command function and/or sequence of command functions executable by the main controller 200 (e.g., also accessible upon manual selection by the end user 202 via the GHMI touchscreen). In some embodiments, the visual sensors 112 may include both IR sensors 112a and visible-light cameras 112b; for example, when the end user 202 is detected, (e.g., "command" mode initiated) the main controller may deactivate the IR sensors 112a and activate the visible-light cameras 112b for more precise detection of unlock and command gestures. It is contemplated that unlock and command gestures may be selected such that no two gestures are easily mistaken for each other; similarly, that unlock and command gestures may be selected such that each gesture may be easily performed by the end user 202, and detected by the visual sensors 112, even when the end user is wearing protective gloves. The main controller 200 may include memory or other data storage, e.g., for storage of reference images and/or sign language databases corresponding to unlock gestures and command gestures, and for any associated command functions or sequences thereof.

In embodiments, when the main controller 200 (e.g., continuing to analyze imagery captured by the visual sensors 112) detects a known command gesture or sequence thereof with sufficient confidence, the main controller may execute any command functions or command sequences associated with the detected command gesture. For example, command gestures (as well as unlock gestures) may be executed by the end user with one or both hands, e.g., in close proximity to the visual sensors 112.

Figure 3A:
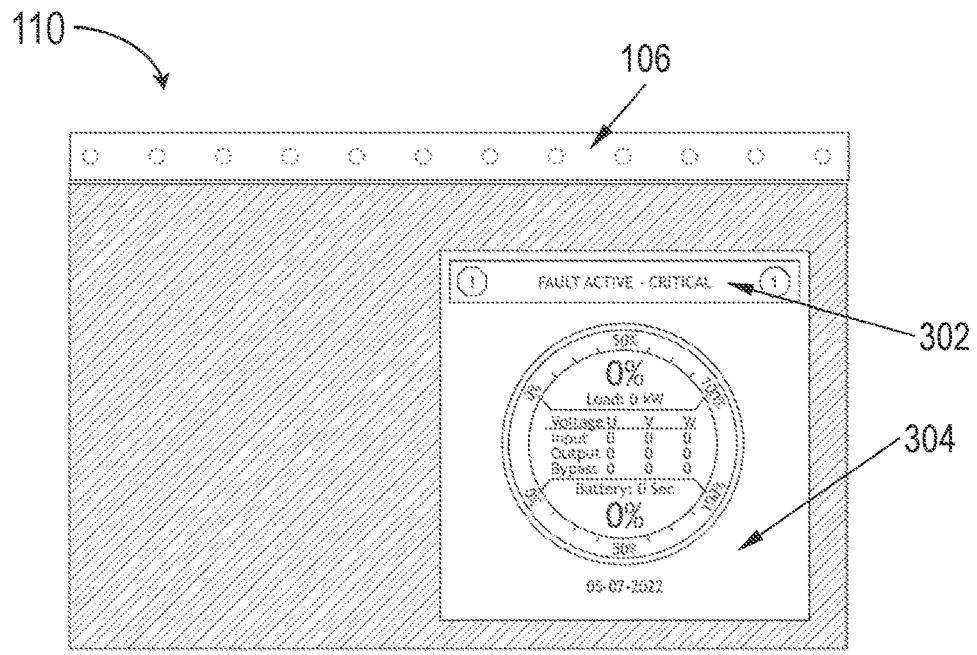
FIG. 3A is a forward view of the intelligent GHMI of FIG. 1 in sleep mode.

Referring now to FIG. 3A, the GHMI unit 110 is shown in "sleep" mode.

In embodiments, when the GHMI unit 110 is in "sleep" mode (e.g., locked configuration), the GHMI may display minimal content indicative of the current operating status of the power controller device 100. For example, the GHMI unit 110 may display an operating status indicator 302 and one or more unit status indicators 304. The operating status indicator 302 may display the general operating status of the power controller device (100, FIG. 1), e.g., nominal (green), warning (yellow), alert (red). Unit status indicators 304 may provide general indications (but more specific than operating status) relevant to, e.g., voltage levels, battery levels, and/or other operating parameters of the power controller device 100. In embodiments, the perimeter lights 106 may additionally illuminate (e.g., in blinking mode) to match the current operating status. In embodiments, the GHMI unit 110 may operate at a reduced intensity relative to "command" and "active" modes.

Figure 3B:
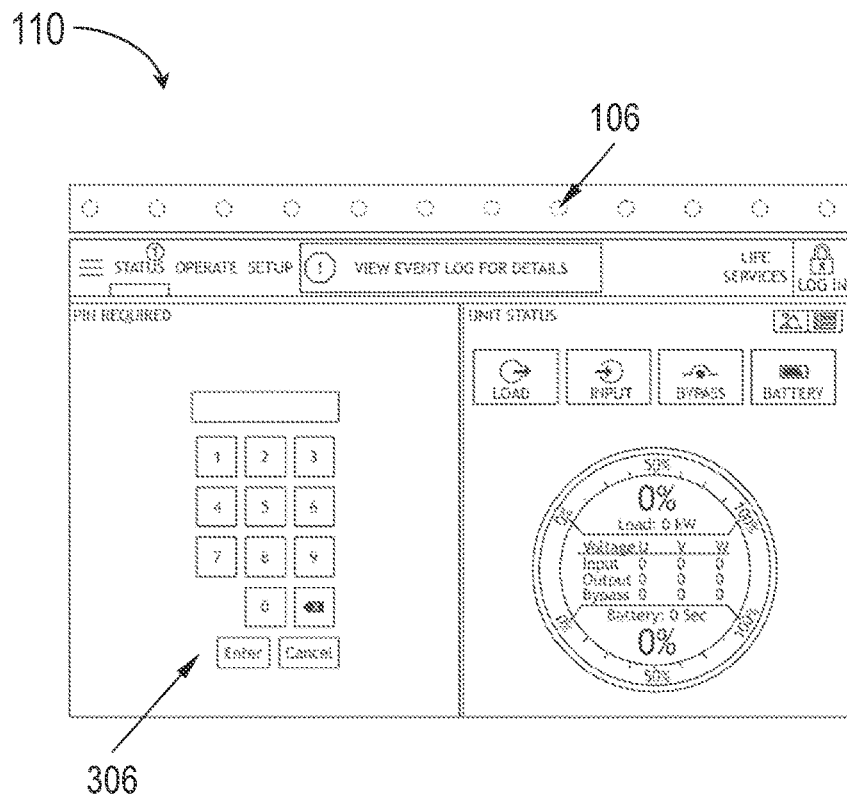
FIG. 3B is a forward view of the intelligent GHMI of FIG. 3A in command mode.

Referring now to FIG. 3B, the GHMI unit 110 is shown in "command" mode.

In embodiments, when the main controller 200 has detected an end user 202 proximate to the power controller device 100 (e.g., within the zone 204) the GHMI unit 110 may transition from "sleep" mode to "command" mode. For example, the display of the GHMI unit 110 may brighten compared to "sleep" mode, and the main controller 200 may deactivate IR visual sensors 112a and activate visible-light cameras 112b for precise detection of unlock and command gestures. In embodiments, when the GHMI unit 110 is in "command" mode, the GHMI unit may remain in locked configuration but display (e.g., via the GHMI touchscreen surface) a keypad or keyboard 306 via which the end user 202 may authenticate themselves as an authorized user of the power controller device 100, e.g., by entering a personal identification number (PIN), password, passphrase, or other encoded information. For example, if the end user 202 is wearing protective gloves that preclude use of the touchscreen surface of the GHMI unit 110, the end user may alternatively perform command gestures to unlock the GHMI unit from "command" mode to "active" mode, e.g., signing a character sequence corresponding to the PIN, password, or passphrase.

Figure 3C:
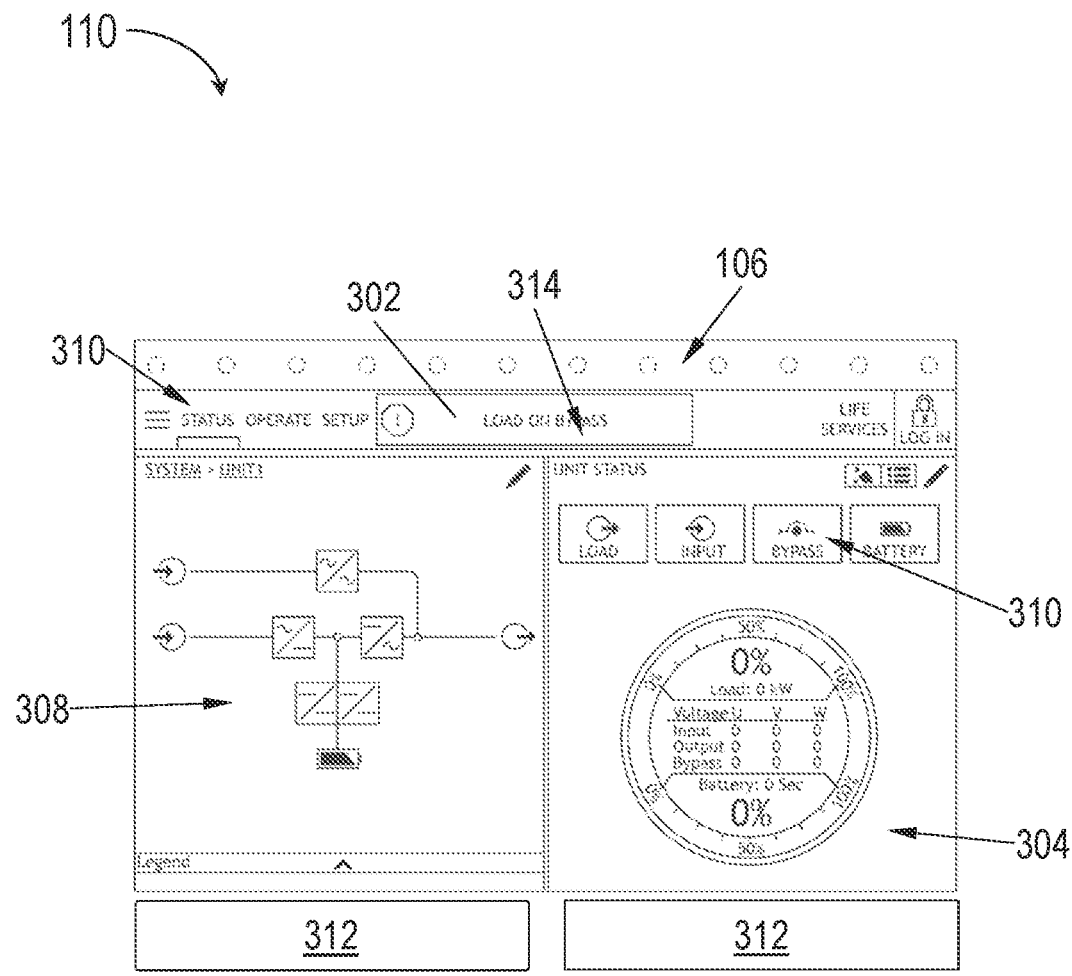
FIGS. 3C through 3E are forward views of the intelligent GHMI of FIG. 3B in active mode.
Figure 3D:
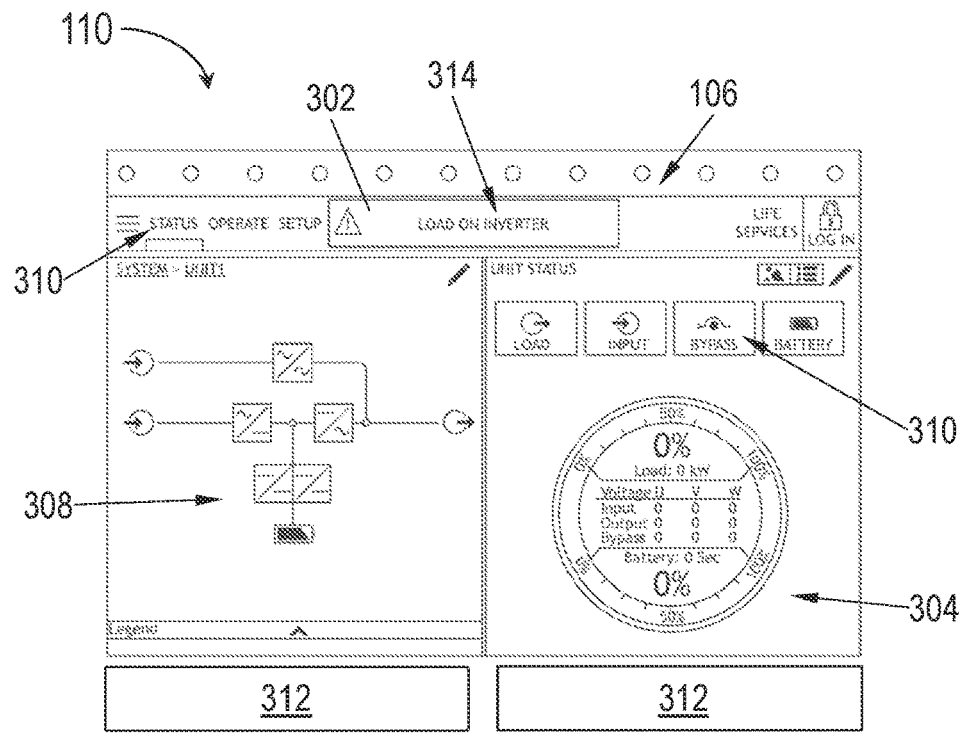
Figure 3E:
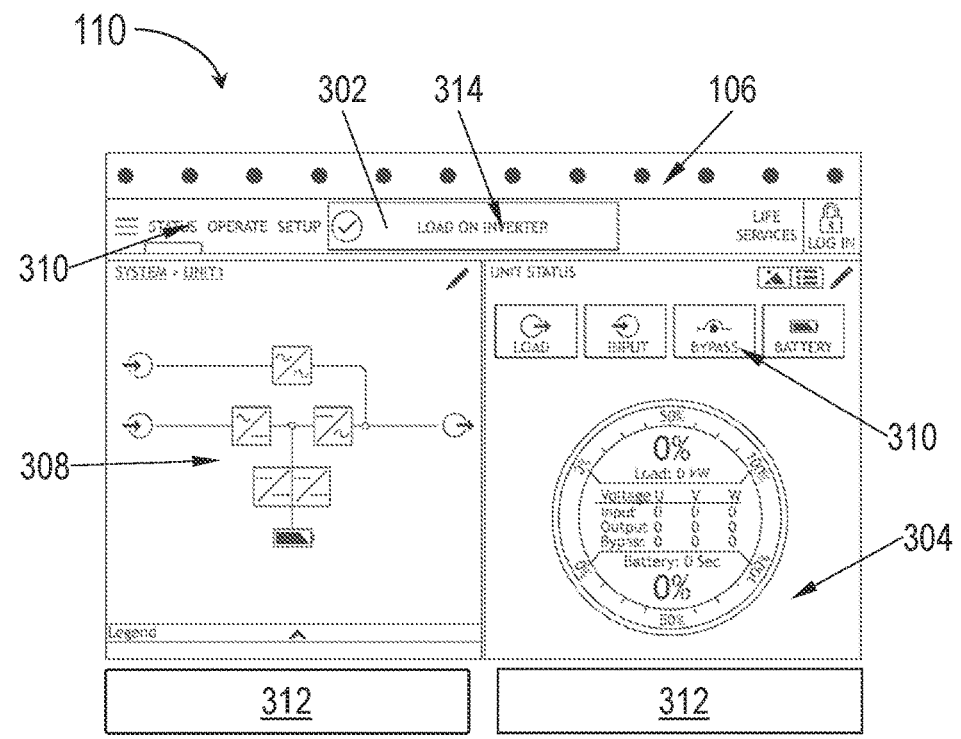

Referring also to FIGS. 3C, 3D, and 3E, the GHMI unit 110 is shown in "active" mode. In embodiments, when an end user (202, FIG. 2) has been detected and authenticated, the GHMI unit 110 may increase the intensity and brightness of the display (e.g., relative to "command" mode, as shown by FIG. 3B) and provide additional "unlocked" content, e.g., additional status indicators 308 and command menu elements 310 accessible to the authenticated end user 202. For example, the end user 202 may access command functions of the power controller device via the command menu elements 310 and/or multifunction buttons 312 (e.g., which may be programmed for execution of frequently executed specific tasks or command functions). However, in embodiments the end user 202 may also execute command functions (e.g., if the end user is wearing protective gloves or equipment that precludes use of a capacitive GHMI display surface) by executing command gestures detectable via the visual sensors (112, FIG. 2), decipherable via the GHMI unit 110 and/or main controller 200, and pre-programmed for execution of specific command functions. In embodiments, the operating status indicator 302 and perimeter lights 106 may be illuminated according to the current operating status, e.g., red/alert as shown by FIG. 3C, yellow/warning as shown by FIG. 3D, green/nominal as shown by FIG. 3E. In some embodiments, the operating status indicator 302 may include additional textual or symbolic content 314 highlighting specific device conditions or states associated with the operating status (e.g., LOAD ON BYPASS, FAULT ACTIVE—CRITICAL, LOAD ON INVERTER).

Figure 4:
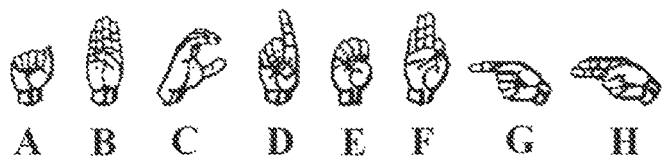
FIG. 4 is an illustration of an unlock gesture or command gesture detection operation of the power controller device of FIG. 1.
Figure 4:
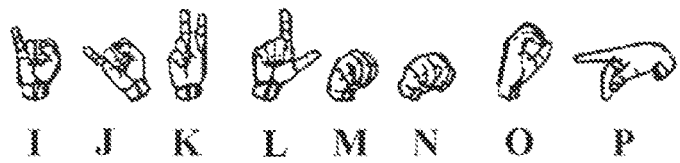
Figure 4:
Figure 4:
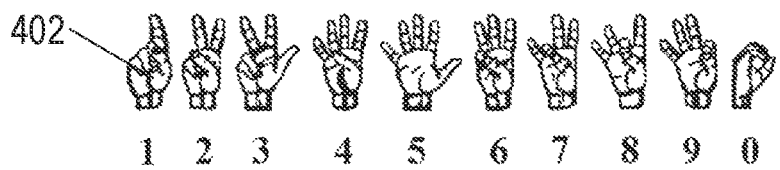
Figure 4:
Figure 4:
Figure 4:
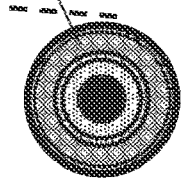

Referring now to FIG. 4, the power controller device (100, FIG. 1) may encode unlock gestures and command gestures via which an end user (202, FIG. 2) may transition the GHMI unit (110, FIG. 1) between "sleep" mode, "wakeup" mode, and "command" mode, access command functions of the power controller device, and execute said command functions. In embodiments, the GHMI unit 110 and visual sensors 112 may be programmed to recognize specific linguistic elements of one or more sign languages 400. For example, sign languages 400 (e.g., American Sign Language (ASL) or other national or regional sign languages depending upon the region within which the power controller device 100 operates) may include individual letters, words, expressions or other linguistic elements 402 mappable by the GHMI unit 110 to specific command functions executable by the power controller device 100.

In embodiments, the end user 202 may sign one or more linguistic elements 402 detectable by the visual sensors 112 (e.g., camera 112b) and decipherable via the GHMI unit 110 and/or main controller 200, either individually, in combination, or in sequence (404; e.g., a letter "C" followed by a letter "L"). For example, when a linguistic element 402 or sequence 404 thereof corresponding to a specific command function (e.g., unlock GHMI, authenticate user) the power controller device 100 may execute the associated command function. In embodiments, programmable linguistic elements 402 may be selected for distinction, e.g., to prevent a given linguistic element from being easily mistaken for another similar linguistic element. Further, selection and mapping of linguistic elements 402 and/or sequences 404 thereof to specific command functions may account for the fact that if the end user 202 is wearing protective gloves that preclude use of a capacitive GHMI display surface, some linguistic elements may be both 1) easier for the end user to sign and 2) more easily decipherable by the GHMI unit 110 than other linguistic elements (e.g., distinguishable from other similar signed characters). In embodiments, linguistic sequences 404 may correspond to personal identification numbers (PIN), passwords, passphrases, and other encoded character sequences as noted above.

Figure 5:
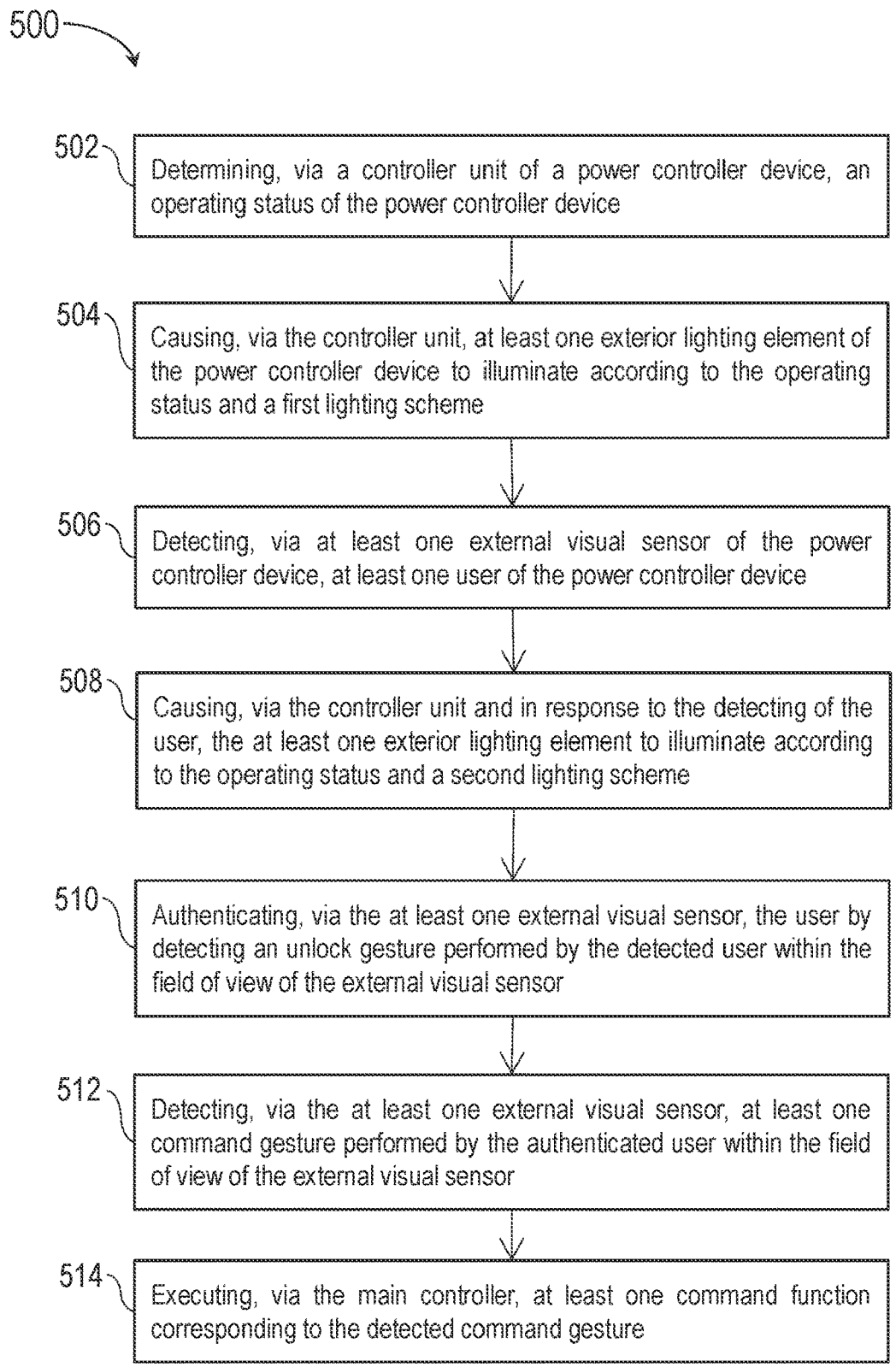
FIG. 5 is a process flow diagram illustrating a method for intelligent human/machine interaction with a power system controller device.

Referring now to FIG. 5, a method 500 for intelligent GHMI operations may be implemented by the power controller device 100 and may include the following steps.

At a step 502, a main controller of the power controller device determines a current operating status of the device, e.g., nominal, warning, or alert.

At a step 504, the main controller illuminates an exterior lighting element of the power controller device to indicate the current operating status. For example, the exterior lighting element may be an LED array whose luminous output is colored in accordance with the operating status (e.g., red, yellow, green). Further, the luminous output may indicate via lighting schemes whether the power controller device is in "sleep" or "command"/"active" modes. For example, the exterior lighting elements blink in the appropriate color if the power controller device is in "sleep" mode. In some embodiments, the exterior lighting elements may be caused to blink faster or slower, e.g., if an alert mode is particularly urgent.

At a step 506, visual sensors of the power controller device detect an end user adjacent or proximate to the power controller device. For example, if the visual sensors (e.g., IR sensors) detect movement or thermal activity within a predetermined radius of the power controller device, the main controller concludes that an end user is present and transitions the power controller device from "sleep" to "command" mode.

At a step 508, the exterior lighting elements change lighting schemes upon detection of an end user and transition to "command" mode. For example, the exterior lighting elements transition from a blink lighting scheme (e.g., "sleep" mode) to a solid luminous output upon transition to "command" mode. In some embodiments, additional auxiliary lights activate (e.g., in a neutral color) to indicate the transition to "command" mode.

At a step 510, upon detection of an end user, the power controller device authenticates the user by detecting (e.g., via the visual sensors) an unlock gesture performed by the end user. For example, the power controller device, upon detection of the end user, may deactivate IR visual sensors and activate visible-light cameras in order to detect unlock and command gestures with greater precision.

At a step 512, upon authentication of a detected end user, the power controller device transitions from "command" to "active" mode and accepts control input via command gestures performed by the end user and detected by the visual sensors and the main controller. For example, the main controller may analyze images captured by the visual sensors in order to identify a preselected command gesture to a sufficient confidence level. Unlock gestures and command gestures may be based, for example, in sign language elements via which the end user signs letters, words, or expressions (e.g., which may correspond to encoded number, password, and/or passphrase sequences) mapped to specific command functions and decipherable by the GHMI as such.

At a step 514, the main controller executes a command function or sequence of command functions associated with the detected command gesture.

CONCLUSION

It is contemplated that embodiments of the inventive concepts disclosed herein may have numerous advantages. For example, the smart GHMI may provide at-a-glance, highly visible indication of the current operating status of a power controller device in a multi-device configuration, such that an end user may quickly determine which if any devices may require intervention. Similarly, an end user wearing protective gloves may interact with and operate any power controller device without removing their gloves and without making physical contact with the device.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

We claim:

1. A power controller device, comprising:
   a main controller configured to determine an operating status of the power controller device;
   an exterior housing;
   one or more lighting elements set into the exterior housing and operatively coupled to the main controller, the one or more lighting elements configured for illumination according to the operating status and according to a first lighting scheme;
   a human/machine interface (HMI) set into the exterior housing and including a touch-sensitive display surface, the HMI operatively coupled to the main controller and configured to display, via the display surface, one or more indicators associated with the operating status;
   at least one visual sensor mounted to the exterior housing, the at least one visual sensor configured to detect a user within a zone adjacent to the exterior housing;
   wherein, when the user is detected within the zone, the one or more lighting elements are configured to illuminate according to the operating status and according to a second lighting scheme.

2. The power controller device of claim 1, wherein the at least one visual sensor includes at least one of an infrared (IR) visual sensor or a visible-light visual sensor.

3. The power controller device of claim 1, wherein:
   when the user is detected within the zone, the at least one visual sensor is configured to authenticate the user by detecting an unlock gesture performed by the user within a field of view of the visual sensor.

4. The power controller device of claim 3, wherein:
   the HMI is associated with a sleep mode, a command mode, and an active mode, the HMI configured to enter the command mode when the user is detected and to enter the active mode when the user is authenticated;
   wherein the HMI, when in the active mode, is configured to:
      display, via the display surface, at least one command menu;
      accept control input from the authenticated user via the display surface;
   and
   wherein the at least one visual sensor is configured to detect at least one command gesture performed by the authenticated user within the field of view of the visual sensor.

5. The power controller device of claim 4, wherein, when the at least one command gesture is detected, the main controller is configured to execute at least one command function corresponding to the detected command gesture.

6. The power controller device of claim 4, wherein each unlock gesture and each command gesture corresponds to a linguistic feature associated with one or more sign languages.

7. The power controller device of claim 1, wherein the first lighting scheme and the second lighting scheme are selected from a group including:
   a solid lighting scheme;
   or
   a blinking lighting scheme.

8. The power controller device of claim 1, wherein:
   the operating status is selected from a group including a nominal status, a warning status, or an alert status; and
   the one or more lighting elements are configured for illumination in at least one color corresponding to the operating status.

9. The power controller device of claim 1, wherein:
   the display surface is configured to at least partially illuminate according to the operating status.

10. The power controller device of claim 1, wherein the one or more lighting elements include at least one perimeter lighting element disposed adjacent to the HMI.

11. The power controller device of claim 1, wherein the one or more lighting elements are first lighting elements, further comprising at least one second lighting element set into the exterior housing.

12. The power controller device of claim 11, wherein the at least one second lighting element includes at least one of a floor light or a backlight configured for illumination according to a neutral lighting scheme not associated with the operating status.

13. The power controller device of claim 11, wherein the at least one second lighting element is configured to activate when the user is detected within the zone.

14. The power controller device of claim 1, wherein the power controller device is selected from a group including a power supply controller, a power converter controller, a rectifier controller, or a thermal monitoring controller.

15. A method, comprising:
   determining, via a controller unit of a power controller device, an operating status of the power controller device;
   causing, via the controller unit, at least one exterior lighting element of the power controller device to illuminate according to the operating status and a first lighting scheme;
   detecting, via at least one exterior visual sensor of the power controller device, at least one user of the power controller device;
   causing, via the controller unit and in response to the detecting of the user, the at least one exterior lighting element to illuminate according to the operating status and a second lighting scheme;
   authenticating, via the at least one exterior visual sensor, the user by detecting an unlock gesture performed by the detected user within a field of view of the exterior visual sensor;
   detecting, via the at least one exterior visual sensor, at least one command gesture performed by the authenticated user within the field of view of the exterior visual sensor;
   and
   executing, via the controller unit, at least one command function corresponding to the detected command gesture.

16. The method of claim 15, wherein the first lighting scheme and the second lighting scheme are selected from a group including:
   a solid lighting scheme;
   or
   a blinking lighting scheme.

17. The method of claim 15, wherein causing, via the controller unit, at least one exterior lighting element of the power controller device to illuminate according to the operating status and a first lighting scheme includes:
   causing the at least one exterior lighting element to illuminate in at least one color corresponding to the determined operating status.

18. The method of claim 15, wherein the operating status is selected from a group including a nominal status, a warning status, or an alert status.

19. The method of claim 15, wherein:
- detecting, via at least one exterior visual sensor of the power controller device, at least one user of the power controller device includes detecting the at least one user via an infrared visual sensor; and
- detecting an unlock gesture performed by the detected user within the field of view of the exterior visual sensor includes detecting the unlock gesture via a visible-light visual sensor.

20. The method of claim 15, wherein each unlock gesture and each command gesture corresponds to a linguistic feature associated with one or more sign languages.

* * * * *